United States Patent [19]

Tanaka et al.

[11] Patent Number: 4,633,389
[45] Date of Patent: Dec. 30, 1986

[54] VECTOR PROCESSOR SYSTEM COMPRISED OF PLURAL VECTOR PROCESSORS

[75] Inventors: Yoshikazu Tanaka, Kitaadachi; Shunichi Torii, Musashino, both of Japan

[73] Assignee: Hitachi, Ltd., Tokyo, Japan

[21] Appl. No.: 462,963

[22] Filed: Feb. 1, 1983

[30] Foreign Application Priority Data

Feb. 3, 1982 [JP] Japan ................... 57-14989

[51] Int. Cl.⁴ ................... G06F 15/347; G06F 15/16
[52] U.S. Cl. ................... 364/200
[58] Field of Search ................... 364/200, 900

[56] References Cited

U.S. PATENT DOCUMENTS

| | | | |
|---|---|---|---|
| 3,684,876 | 8/1972 | Sutherland | |
| 4,128,880 | 12/1978 | Cray, Jr. | 364/200 |
| 4,490,786 | 12/1984 | Nakatani | 364/200 |
| 4,507,728 | 3/1985 | Sakamoto et al. | 364/200 |
| 4,525,796 | 6/1985 | Omoda et al. | 364/200 X |
| 4,541,046 | 9/1985 | Nagashima et al. | 364/200 |

FOREIGN PATENT DOCUMENTS

0022274 1/1981 European Pat. Off.
0042442 12/1981 European Pat. Off.

OTHER PUBLICATIONS

Proceedings of the 1981 International Conference on Parallel Processing, 25–28 Aug. 1981, pp. 266–273, IEEE, N.Y., A. J. Krygiel, "Synchronous Nets for Single Instruction Stream–Multiple Data Stream Computer".

Datamation, vol. 24, No. 2, Feb. 1978, pp. 159–172, Barrington, U.S., C. Jensen: "Taking Another Approach To Supercomputing".

Primary Examiner—James R. Hoffman
Attorney, Agent, or Firm—Antonelli, Terry & Wands

[57] ABSTRACT

An array processor includes a central vector processing unit including a plurality of vector registers and a pipeline control arithmetic and logical operation unit (ALU) operative to execute an instruction (vector instruction) requiring vector processing, and a plurality of vector processing units including a plurality of vector registers and a pipe-line control ALU operative to execute an instruction (array instruction) requiring array processing. The central vector processing unit fetches and decodes the vector instruction or the array instruction to execute the decoded instruction, when this instruction is a vector instruction, but operates to start the vector processing units when the decoded instruction is an array instruction. Each of the vector processing units executes that operation to one of plural vector data comprising array data to be an object of the operation designated by the decoded instruction, which is designated by the instruction for one of the vector data, when the decoded instruction is an array instruction. When the result of the operation designated by the array instruction is vector data, each of the vector processing units computes and stores one element of vector data in built-in scalar registers, and sends out that element to the central vector processing unit so that the element may be stored in vector registers in the central vector processing unit. When the result of the operation designated by the array instruction is array data, each of the vector processing units computes and stores one vector data of those resultant array data in built-in vector registers.

14 Claims, 21 Drawing Figures

```
      DO 10 J=1,M
      DO 20 I=1,N
      A(I,J)=B(I,J)+C(I,J)
   20 CONTINUE
   10 CONTINUE
```

```
      ⎧      DO 20 I=1,N
   A1 ⎨      A(C,1)=B(I,1)+C(I,1)
      ⎩   20 CONTINUE

⎧      DO 20 I=1,N
   A2 ⎨      A(I,2)=B(I,2)+C(I,2)
      ⎩   20 CONTINUE
                  ⋮
      ⎧      DO 20 I=1,N
   AM ⎨      A(I,M)=B(I,M)+C(I,M)
      ⎩   20 CONTINUE
```

| Ai | Vi | DESIGNATED REG |
|----|----|----------------|
| 1  | 1  | ARRAY REG (AR) |
| 0  | 1  | VECTOR REG (VR)|
| 0  | 0  | SCALAR REG (SR)|

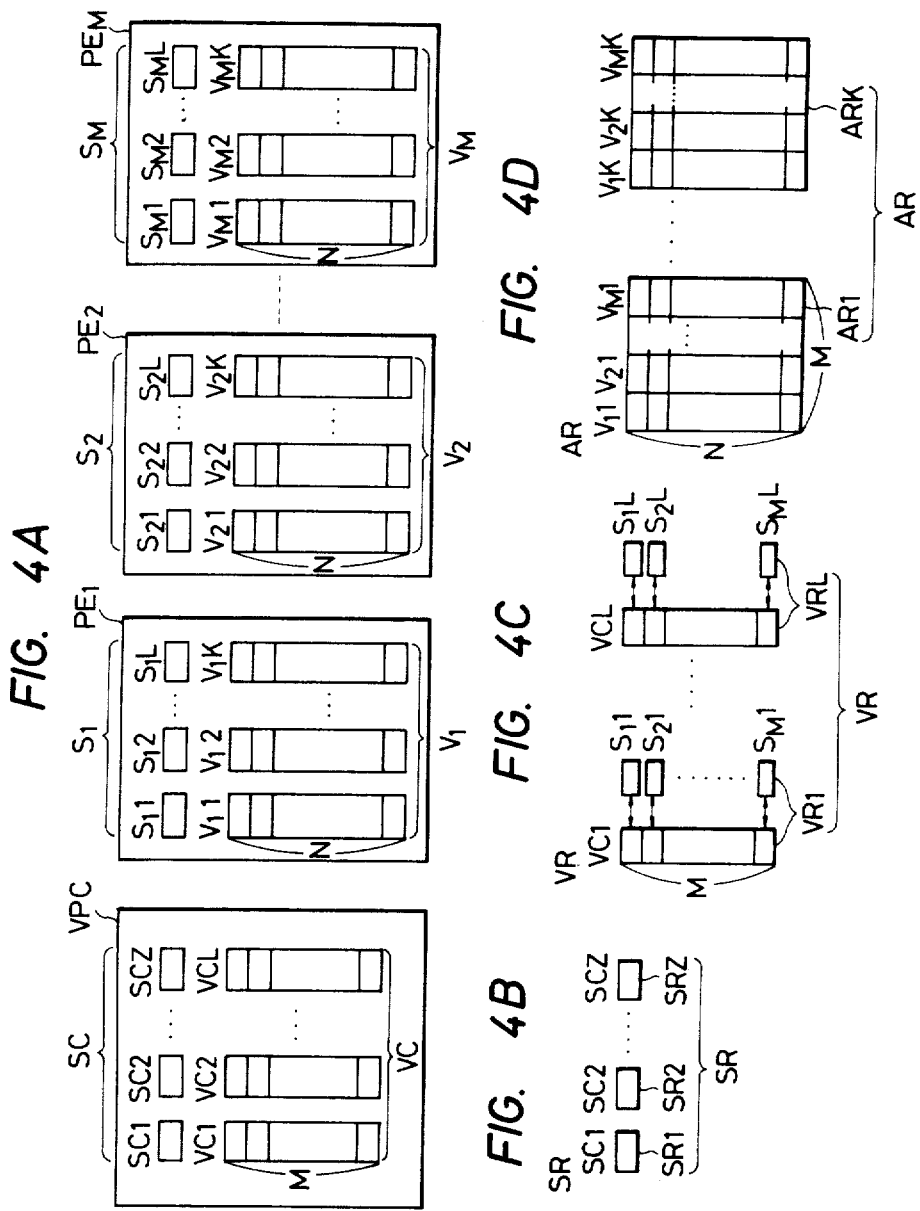

FIG. 7A

```
    DO 10 J=1,M
    DO 20 I=1,N
    A(I,J)=BI,J)*C(I,J)      MULT AR1, AR2, AR3
 20 CONTINUE
 10 CONTINUE
```

FIG. 7B

```
    DO 10 J=1,M
    DO 20 I=1,N
    A(I,J)=B(I,J)*X(J)       MULT AR1, AR2, VR1
 20 CONTINUE
 10 CONTINUE
```

FIG. 7C

```
    DO 10 J=1,M
    X(J)=Y(J)*Z(J)           MULT VR1, VR2, VR3
 10 CONTINUE
```

FIG. 7D

```
    DO 10 J=1,M
    X(J)=Y(J)*S              MULT VR1, VR2, SR1
 10 CONTINUE
```

```
SCALAR INSTRUCTION              VECTOR AND ARRAY
SERIES                          INSTRUCTION SERIES

⎫                            ADD    VR1,VR2,SR6~V1
  ⎬ SCALAR SETUP               MULT   VR3,VR2,SR4~V2
  ⎪ INSTRUCTION                ADD    VR4,VR3,SR1~V3
  ⎭ SERIES                     ADD    VR5,VR3,SR2~V4
                               ADD    VR6,VR3,SR3~V5
  SVP~S2                       MOVE   VR7,SR5    ~V6
 [TVP~S3                       LOAD   AR1,VR5,VR7~V7
                               LOAD   AR2,VR6,VR7~V8
                               ADD    AR3,AR1,AR2~V9
                               STORE  AR3,VR4,VR7~V10
                               EAP             ~V11
```

FIG. 12A

```
      DO 10 J=1,M
      S(J)=X(J)+Y(J)
      DO 20 I=1,N
      S(J)=S(J)+A(I,J)*B(I,J)    PROD  VR3,AR1,AR2~V101
   20 CONTINUE                   LOAD  VR4,SR1,SR2~V102
      C(J)=D(J)+S(J)             ADD   VR5,VR3,VR4~V103
   10 CONTINUE
```

FIG. 12B

```
      DO 10 J=1,M
      S=S+X(J)*Y(J)              PROD  SR7,VR7,VR8~V104
   10 CONTINUE
```

VECTOR PROCESSOR SYSTEM COMPRISED OF PLURAL VECTOR PROCESSORS

BACKGROUND OF THE INVENTION

1. Field of the Invention

The present invention relates to a digital type electronic computer which is suitable to effect array processing of the type which makes it possible to execute array computations at a high speed (and which will be shortly referred to as an "array processor").

2. Description of the Prior Art

In scientific and technical computations, two-dimensional arrays, as are illustrated in the FORTRAN program of FIG. 1, are so demanded that they can be computed at a high speed. The one-dimensional and two-dimensional arrays will be shortly referred to as "vectors" and "arrays", respectively, in the following. In order to speed up the array computations, there have been taken until now the following two approaches. The first approach is the array processor system in which a number of processors are arranged two-dimensionally in parallel and execution occurs simultaneously in parallel for a number of array elements. This approach makes it possible to improve performance on principle in proportion to the number of the processors by increasing the processor number. In case the number of the array elements to be processed is smaller than that of the processors installed, however, the availability of the processor is so low that the approach does not economically pay. The second approach is the vector processor system in which the vector processings are speeded up by using vector registers and pipeline control computers. This system is represented by that which is disclosed in U.S. Pat. No. 4,128,880. The vector processor can speed up the processings of a single "Do" loop but has a limit to the speedup of its double loop processings. This is because the program of FIG. 1 is usually divided into single-loop processings A1 to AM, as shown in FIG. 2, which have to be serially executed.

SUMMARY OF THE INVENTION

It is, therefore, an object of the present invention to provide an array processor which has a simple construction but is able to execute double-Do-loop processings at a high speed by executing each of the internal loop processings of the double-Do-loop processings through a pipeline control and by executing those Do loop processings in parallel with one another.

In order to achieve this object, according to the present invention, there is provided an array processor which is constructed of: a central vector processing unit including a plurality of vector registers and a pipeline control arithmetic and logical operation unit and made operative to execute an instruction requiring the processing of vectors (which instruction will be shortly referred to as a "vector instruction"); and a plurality of vector processing units including a plurality of vector registers and a pipeline control arithmetic and logical operation unit and made operative to execute an instruction requiring the processings of arrays (which instruction will be shortly referred to as an "array instruction"). The central vector processing unit fetches and decodes the vector instruction or the array instruction to execute the decoded instruction, when this instruction is the vector instruction, but to start those vector processing units, when the decoded instruction is the array instruction.

Each of the vector processing units executes that operation to one of vector data comprising array data to be an object of the operation designated by the decoded instruction, when the decoded instruction is the array instruction. When the result of the operation designated by the array instruction is the vector data, each of the vector processing units computes and stores one element of those vector data in built-in scalar registers, and sends out that element to the central vector processing unit so that the element may be stored in vector registers in the central vector processing unit. When the result of the operation designated by the array instruction is the array data, each of the vector processing units computes and stores one vector data of those resultant array data in built-in registers.

BRIEF DESCRIPTION OF THE DRAWINGS

FIG. 4A is an explanatory view showing the registers which are used in the array processor of FIG. 3;

FIGS. 4B to 4D are views respectively showing conceptual scalar, vector and array registers;

FIGS. 7A to 7D are diagrams showing the differently used examples of the instructions of the processor of FIG. 3;

FIG. 10 is a block diagram showing the construction of an operation result send requiring circuit which is used in the processor of FIG. 3;

FIGS. 11A to 11C are diagrams showing an example of the FORTRAN program requiring the array processings and an example of vector and array instructions therefor; and FIGS. 12A and 12B are diagranms showing another example of the FORTRAN program requiring the array processings and an example of corresponding vector and array instruction series.

DESCRIPTION OF THE PREFERRED EMBODIMENT

Figure 3:
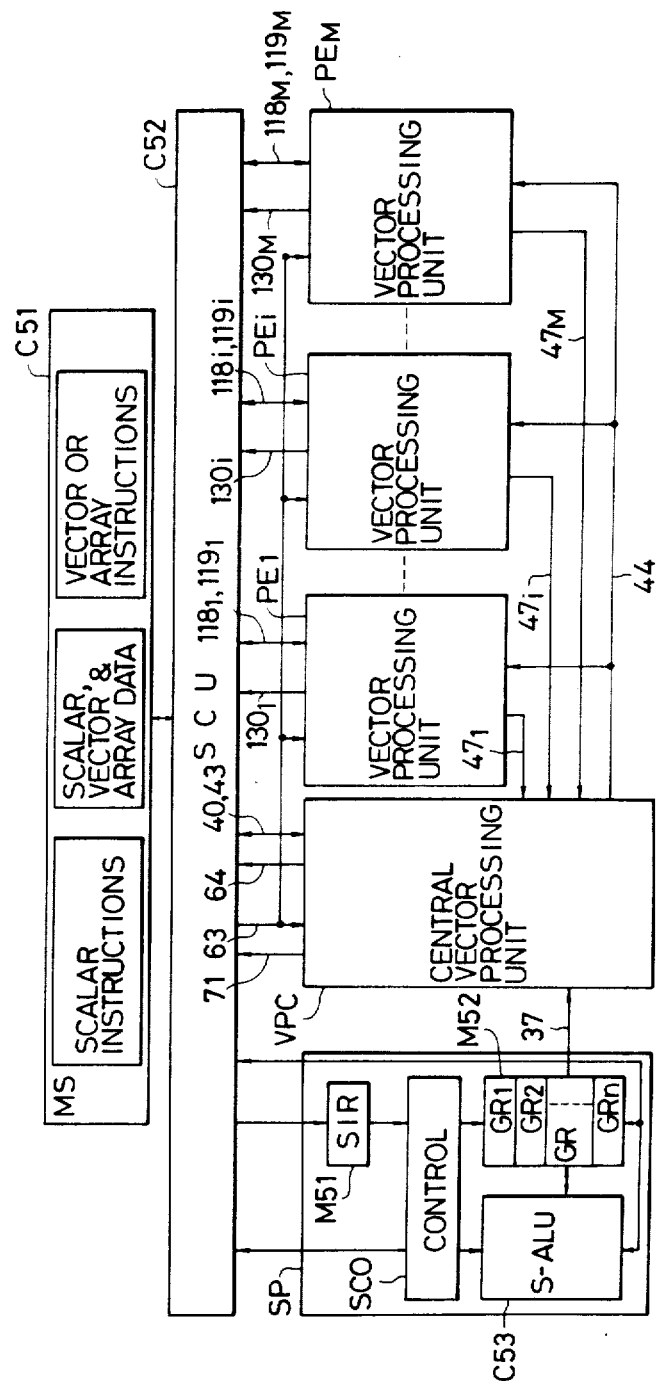
FIG. 3 is a block diagram showing the overall construction of an array processor according to the present invention.

The present invention will now be described in connection with an embodiment thereof. As shown in FIG. 3, the array processor according to the present invention is constructed of a scalar processing unit SP, a central vector processing unit VPC, an M number of vector processing units $PE_1$ to $PE_M$, a main storage unit (MS) C51 shared among them, and a main storage control unit (SCU) C52. In the main storage unit C51, there are separately stored a scalar instruction series and a vector and array instruction series which is composed of vector instructions, i.e., instructions requiring not array processings but vector processings and array instructions, i.e., instructions requiring array processings. There are additionally stored in the main storage unit C51 scalar, vector and array data, all of which are accessed by the main storage control unit C52. In the following, both the vector instructions and the array instructions may be simply called "vector and array instructions".

The scalar processing unit SP is composed of a scalar instruction register (SIR) M51 a general register (GR) M52, a scalar arithmetic and logical operation unit (ALU) C53, and a control SCO for controlling the general register M52 and the scalar ALU C53, by all of which the scalar instruction series in the main memory unit C51 is executed. This scalar instruction series includes general scalar instructions, e.g., instructions which are described in the Manual "System/370 Principles of Operation" (GC-22-7000), which has been published by IBM Inc. In response to these instructions, the scalar processing unit SP executes scalar operations of the scalar data in the general resistor M52 or the main storage unit C51 to store the result into the general register M52 or the main storage unit C51. Moreover, the scalar processing unit SP executes not only that scalar instruction but also both the scalar instruction for reading out the data, which is necessary for the operations of the central vector processing unit VPC and the vector processing units $PE_1$ to $PE_M$, from the general register M52 and sending it to the central vector processing unit VPC and scalar instructions for designating the start of the central vector processing unit VPC (as will be described in more detail later on).

The central vector processing unit VPC is started by the scalar processing unit SP to fetch vector and array instruction series from the main storage unit C51 to thereby execute the vector instructions, when the fetched instructions are vector instructions, and to start the vector processing units $PE_1$ to $PE_M$ when the fetched instructions are array instructions. Moreover, the central vector processing unit VPC determines vector data, which is necessary for the array processings at the vector processing units $PE_1$ to $PC_M$, by vector processings and sets them up in those units $PE_1$ to $PE_M$ through a line 44. These vector processing units $PE_1$ to $PE_M$ are combined to execute one array instruction, and each vector processing unit $PE_i$ executes operation, which is designated by that array instruction, for one column or row vector of array data, which is designated by that array instruction, in parallel with another vector processing unit $PE_j$.

In the present embodiment, the vector processing units $PE_1$ to $PE_M$ are so constructed as to execute only those array instructions which produce array or vector data as results of operations thereby, but not those array instructions which produce the scalar data as results of operations thereby. As a result, those array processings which produce scalar data as results of operations thereby are executed by means of both those array instructions which produce vector data as results of those operations and vector instructions for obtaining the scalar data by the use of those result vectors. Those array and vector instructions are executed by the vector processing units $PE_1$ to $PE_M$ and the central vector processing unit VPC, respectively.

In order to make use of the result vectors of the array processings at the vector processing units $PE_1$ to $PE_M$, therefore, the central vector processing unit VPC is so constructed as to receive the operation result vectors from the vector processing units $PE_1$ to $PE_M$ through lines $47_1$ to $47_M$.

Of the array processings, the array processings using array data and scalar data are not executed in the vector processing units $PE_1$ to $PE_M$. When these array processings are to be executed, the central vector processing unit VPC executes the vector instructions for making vector data from those scalar data and transfers those vector data to the vector processing units $PE_1$ to $PE_M$, in which the array instructions for designating computatios of the array data and those vector data are executed. For this purpose, the central vector processing unit VPC is so constructed as to transfer the vector data obtained by the vector computations to the vector processing units $PE_1$ to $PE_M$ through a line 44.

In the present embodiment, the scalar processing unit SP sends an access request to the main storage control unit C52 so as to fetch the scalar instructions or the scalar data or to store the scalar data in the main storage unit C51. Moreover, the central vector processing unit VPC sends the access request to the main storage control C52 so as to fetch the vector and array instructions and the vector data or to store the vector data in the main storage unit C51. On the other hand, the vector processing units $PE_1$ to $PE_M$ respectively send access requests for fetching or storing one row or column vector in array data to the main storage control C52.

The vector and array instructions, which are fetched on the basis of the instruction fetching request from the central vector processing unit VPC, are also fed to the central vector processing unit VPC and the vector processing units $PE_1$ to $PE_M$ are received by the vector processing units $PE_1$ to $PE_M$ only when they are array instructions (although the detailed description will be made hereinafter).

In response to the read request of scalar data or scalar instructions from the control unit SCO of the scalar processing unit SP, the main storage control unit C52 reads out the scalar data or instructions, which are designated by the addresses given from the control unit SCO of the scalar processing unit SP, from the main storage unit C51 and sends out the scalar data to the general register M52 or the scalar ALU C53 of the scalar processing unit SP and the scalar instructions to the scalar instructions register M51. In response to the write request of the data from the control unit SCO of the scalar processing unit SP, moreover, the main storage control unit C52 stores the scalar data, which is given from the general register M52 or the scalar ALU C53 of the scalar processing unit SP, at such a position of the main storage unit C51 as is designated by the address given from the control unit SCO of the scalar processing unit SP.

In response to the read request for the data or the vector or array instructions from the central vector processing unit VPC, likewise, the main storage control unit C52 reads out the data or the vector or array instructions, the addresses of which are respectively specified by that unit VPC through a line 64 or 71, from the main storage unit C51 and sends them to the central vector processing unit VPC through a line 43 or 63, respectively, and the vector or array instructions on the line 63 are also sent out to the vector processing units $PE_1$ to $PE_M$. In response to the write requirement of the data from the central vector processing unit VPC, moreover, the main storage control unit C52 stores the data on a line 40 at such a position in the main storage unit C51 as is designated by the address given from that unit VPC through the line 64.

In response to the data read requirement from the vector processing unit $PE_i$ (i=1 to M), likewise, the main storage control unit C52 reads out the data, which is designated on an address line $130_i$, and sends it out to the vector processing unit $PE_i$ through a line $119_i$. In response to the data write requirement from the vector processing unit $PE_i$, furthermore, the main storage control unit C52 stores the data on a line $118_i$ at such a position in the main storage unit C51 as is designated by the address line $130_i$.

As has been described in the above, the main storage control unit C52 according to the present invention is so constructed as to separately respond to the access requirements coming from the scalar procesing unit SP, the central vector processing unit VPC and an M number of the vector processing units $PE_1$ to $PE_M$.

The central vector processing unit VPC is composed, as shown in FIG. 4A, of an L number of vector registers VC1 to VCL having a vector length M and a Z number of scalar registers SC1 to SCZ. On the other hand, each vector processing unit $PE_i$ is composed of a K number of vector registers Vi1–ViK having a vector length N and such an L number of scalar registers $S_i1$ to $S_iL$ as is equal to that of the vector registers of the central vector processing unit VPC. By reconstructing those register groups, as shown in FIGS. 4B to 4D, there are provided specified conceptual scalar registers SR for handling the scalar data, conceptual vector registers VR for handling the vector data, and conceptual array registers AR for handling the array data. In other words, the scalar registers SC1 to SCZ and the vector registers VC1 to VCL of the central vector processing unit VPC are specified, as they are, as conceptual scalar registers SR1 to SRZ and conceptual vector registes VR1 to VRL, respectively. As shown in FIG. 4C, moreover, the scalar registers of identical reference numerals of the respective vector processing units $PE_1$ to $PE_M$, e.g., the scalar registers $S_11$ to $S_M1$ arranged in this order are also specified as the first conceptual vector register VR1. Likewise, the second to Lth conceptual vector registers VR2 to VRL are also specified. Since the identical conceptual vector register $VR_j$ is specified by both the vector register $VC_j$ of the central vector processing unit VPC and the scalar registers $S_1j$ to $S_Mj$ of the vector processing units $PE_1$ to $PE_M$, the present embodiment is so controlled that the vector register $VC_j$ and the scalar registers $S_1j$ to $S_Mj$ may have an identical content, as will be described in detail hereinafter. Moreover, the vector registers of an identical numeral of the vector processing untis $PE_1$ to $PE_M$, e.g., the vector registers $V_11$ to $V_M1$, as arranged in the order of FIG. 4D, are specified as a first conceptual array register AR1. Likewise, conceptual array registers AR2 to ARK are specified. As a result, the embodiment is equipped as its conceptual registers with a K number of conceptual array registers AR having an N×M construction, an L number of conceptual vector registers VR having the vector length M, and a Z number of scalar registers. In the present embodiment, the conceptual registers, which can be accessed by the central vector processing unit VPC and by the vector processing units $PE_1$ to $PE_M$, are different. More specifically, the central vector processing unit VPC can handle both the L number of the conceptual vector registers VR (j=1 to L) and the Z number of the conceptual scalar registers $SR_i$ (i=1 to Z) but not the K number of the conceptual array registers $AR2k$ (k=1 to K). On the other hand, the vector processing units $PE_1$ to $PE_M$ can handle both the conceptual array registers $AR_k$ (k=1 to K) and the conceptual vector resisters $VR_j$ (j=1 to L) but not the conceptual scalar registers $SR_i$ (i=1 to Z). In this system, therefore, the computations of the array data and the scalar data cannot be directly executed by the vector processing units $PE_1$ to $PE_M$. In this case, the execution is done by the vector processing units $PE_1$ to $PE_M$ with the use of the conceptual vector registers $VR_j$ and the conceptual array resisters $AR_k$ after the content of the conceptual scalar registers has been transferred to that conceptual vector registers $VR_j$. In other words, the conceptual vector registers $VR_j$ provides an interface between the cental vector processing unit VPC and the vector processing units $PE_1$ to $PE_M$.

On the contrary, in case the vector computations with other scalar data are to be conducted by the use of the vector data which have been obtained as a result of the computations of the array data having been executed by the vector processing units $PE_21$ to $PE_M$, the central vector processing unit VPC conducts the vector computations by the aforementioned result vector data which exist in the conceptual vector registers $VR2j$.

For this purpose, the contents of the vector register $VC_j$ and the scalar register groups $S_1j$ to $S_Mj$ both constructing the conceptual vector registers $VR_j$ are so called that they may become identical. More specifically, in case the vector data is obtained as a result of the fact that the vector processing units $PE_1$ to $PE_M$ have conducted the array data, they are stored not only in the scalar register groups $S_1j$ to $S_Mj$ but also in the vector register $VC_j$. On the contrary, in case the vector data is obtained as a result of the fact that the central vector processing unit VPC has conducted the computations for the vector data, they are stored not only in the vector register $VC_i$ but also in the scalar register groups $S_1i$ to $S_Mi$. For simplicity of description, incidentally, the conceptual scalar registers, the conceptual vector registers and the conceptual array registers will be shortly referred to as the scalar registers SR, the vector registers VR and the array registers AR, respectively. On the other hand, the ith conceptual scalar register will be shortly referred to as the scalar register $SR_i$. Like short references are made for the conceptual vector registers and array registers. In the following, moreover, the scalar registers SC1 to SCZ, $S_11$ to $S_1L$, $S_21$ to $S_2L$, - - -, and $S_M1$ to $S_ML$ may be called together scalar registers SC, $S_1$, $S_2$, - - -, and $S_M$. Likewise, the vector registers VC1 to VCL, $V_11$ to $V_1k$, $V_21$ to $V_2k$, - - -, and $V_M1$ to $V_Mk$ may be called together vector registers VC, $V_1$, $V_2$, - - -, and $V_M$.

Figures 1, 2, 5, 6:
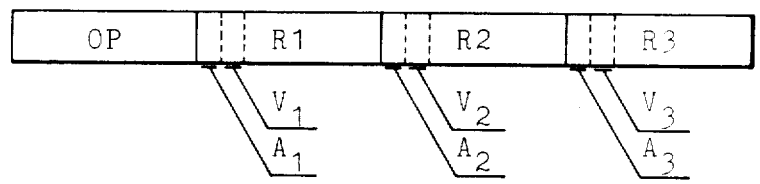
FIG. 1 is a diagram showing one example of the FORTRAN program of operation which receives array processing.
FIG. 2 is a diagram showing the executing procedures of the FORTRAN program of FIG. 1 in a vector processor according to the prior art.
FIG. 5 is a view showing the format of the instruction word of a vector or array instruction for operating the array processor of FIG. 3.
FIG. 6 is an explanation table tabulating the kinds of the registers which are designated by the instruction word of FIG. 5.

FIG. 5 shows the instruction format which describes the vector and array instructions used in the array processor of the present invention. An OP filed designates an instruction code, an R1 field designates the register number in which is stored on principle the computation result, and R2 and R3 fields designate the register number which provide the inputs for the computations on principle. $A_1$ and $V_1$ bits are used to discriminate whether the register designated by the R1 field belongs to the array registers AR, the vector registers VR or the scalar registers SR, so that they indicate the array registers AR when they are "11", the vector registers VR when they are "01", and the scalar registers SR when they are "00". Likewise, A$_2$ and V$_2$ bits, and A$_3$ and V$_3$ bits respectively indicate the kinds of the registers, which are designated by the R2 and R3 fields. By separating the instruction codes, the register numbers and the register kinds in the ways thus far described, the computations of the various registers can be uniformly designated by the same instruction codes, as shown in FIGS. 7A to 7D.

FIGS. 7A to 7D itemize the instruction words of the present invention for executing the program portions which are itemized at their respective lefthand portions. Here, the word MULT indicates the instruction code for a multiplication.

In the case of FIG. 7A, the program as shown is executed by storing A(I,J) to an array register AR1 representing the produce of the array data B(I,J) and C(I,J) which are respectively stored in the array registers AR2 and AR3. This execution of the produce can be handled by one instruction word containing only the array register number.

Likewise, the program of FIG. 7B is executed by storing A(I,J) to an array register AR1 representing the product of the data B(I,J) existing in the array registers AR2 and the vector data X(J) existing in the vector registers VR1. The instruction word designating that product contains the array register number and the vector register numbers, as shown.

The program of FIG. 7C is executed by storing X(J) to the vector register VR1 representing the product of vector data Y(J) and Z(J) existing in the vector registers VR2 and VR3. The instruction word designating the execution of that product contains only the vector register numbers, as shown.

The program of FIG. 7D is executed by storing X(J) to the vector register VR1 representing the product X(J) of the vector data Y(J) existing in the vector registers VR2 and scalar data S existing in the scalar register SR1. The instruction word designating the execution of that product contains the scalar register number and the vector register numbers.

Thus, even for the multiplications between the array registers, between the array registers and the vector registers, between the vector registers and between the vector registers and the scalar registers, the identical instruction codes and the identical instruction formats can be used. The difference in the kinds of the registers used is reflected only upon the difference in the values of the Ai and Vi bits.

The instruction having designated the array register in any of the R1, R2 and R3 fields will be shortly referred to as an "array instruction". The instruction has no array register but a vector register designated will be defined as a "vector instruction".

Moreover, the computations or processings by the array instructions will be shortly referred to as "array computations" or "array processings", respectively. Likewise, the computations or processings by the vector instructions will be shortly referred to as "vector computations" or "vector processing", respectively.

Figure 8:
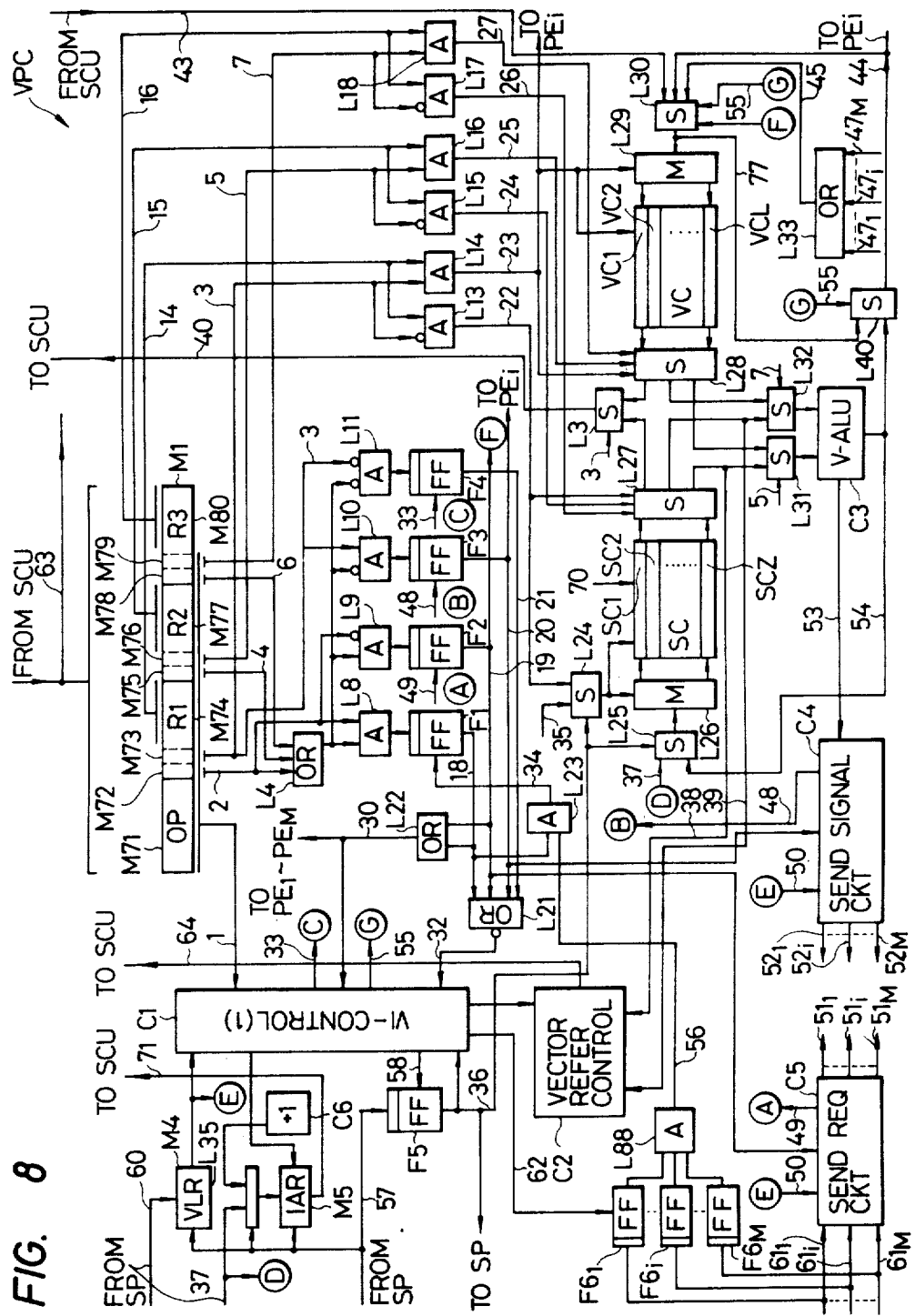
FIG. 8 is a block diagram showing the construction of a center vector processing unit which is used in the processor of FIG. 3.
Figure 9:
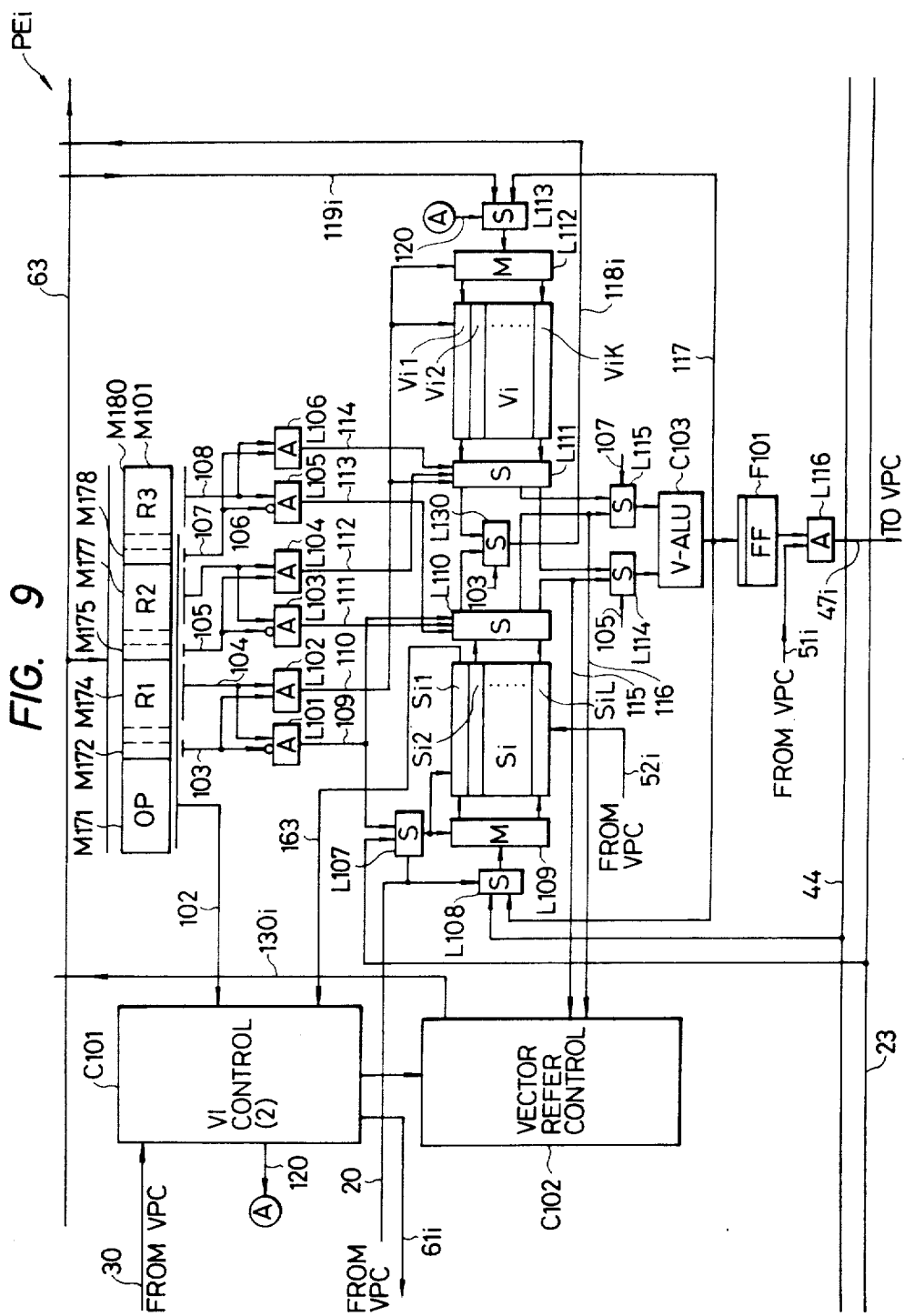
FIG. 9 is a block diagram showing the construction of a vector processing unit which is used in the processor of FIG. 3.

FIGS. 8 and 9 respectively show the details of the central vector processing unit VPC and the vector processing unit PE$_i$. The operations of these units will be described in detail in the following on the basis of the program of the array computation shown in FIG. 11A.

Figures 10, 11C:
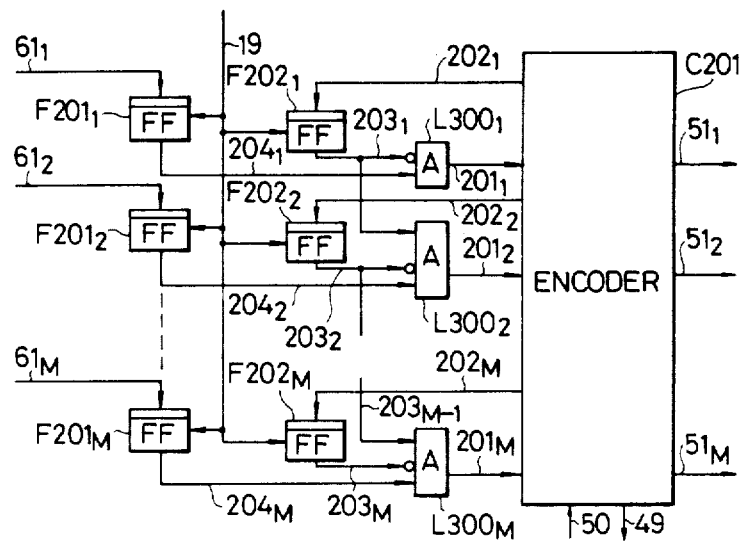

Now, let it be assumed that any of the array data A, B and C be composed of 100×100 elements, each of which has a length of 8 bytes. Moreover, the respective elements of the array data A are assumed such that the elements having an identical control variable J be stored in series in the order of the magnitudes of control variables I in the main storage unit C51, as shown in FIG. 11C. It is also assumed that the arrangements of the respective elements of the array data B and C be made similar.

In the program of FIG. 11A, the control variable J is sequentially varied from 1 to M, and the control variable I is sequentially varied from 1 to J+1 for the respective values of the variable J thereby to determine the sum A(I, J) of the array elements B(I, J) and C(I J) for each combination of the variables I and J. The statement for designating the values M is not shown for the purpose of simplicity. The data, which is obtained for a certain value of the control variable J by varying the control variable I, namely, the data A(I, J), B(I, J) and C(I, J) to be processed by the internal loop become one vector datum. As a result, the array data, e.g., A constitutes a set of the vector data corresponding to the different J values.

In the present embodiment, the vector processing unit PE$_i$ vector-processed such one of column vector data A(I, i) (I=1 to i+1) in a pipeline manner that the control variable J has the value i, namely, the vector data to be processed by the internal loop, and the vector processings at the respective vector processing units PE$_1$ to PE$_M$ are executed in parallel with one another. Thus, the processing of the array data are conducted at a high speed. Although, in this case, the vector lengths of the prospective column vectors are different, the present embodiment is so contracted that each vector processing unit PE$_i$ can conduct the computation of each arbitrary vector length necessary. In order to prepare the data which is necessary for executing the vector or array computations required by the program, the present embodiment requires the following set up processings. Of the following set up processings, incidentally, the scalar processing are executed in the scalar processing unit SP whereas the vector processing are in the central vector processing unit VPC.

Set Up 1:

The number of the values, which can be taken by the control variables I and J of a double DO loop indicating the array computation, is computed. The number of the values, which can be taken by the control variable J of an external DO loop, will be called a "vector length VL". This computation is conducted by the scalar processing unit SP (i.e., in the scalar processing). In this example, the vector length VL takes the value M from the range of J. On the other hand, the number of the values, which can be taken by the control variable I of the interal DO loop, will be called a "vector length AL". This vector length AL is generally a function of the control variable J of the external DO loop and is a vector quantity so that is will be expressed in the form of AL(J). This vector length AL(J) indicates that which is to be processed by each vector processing unit PE(J). These computations are conducted by the scalar processing and by the vector processings. In this example, the vector length AL(J) takes values 2, 3 - - - , and M+1, respectively, for J=1, 2, - - - , and M from the range of the variable I. Moreoever, in case the program to be executed is made of a single loop, i.e., in case the vector computations are required, the range which can be taken by the control variables of that single DO loop is computed as the vector lengths VL to be processed (i.e., in the scalar processing).

Set Up 2:

The start address VADR at the storage position on the main storage of the vector or array data to be vector- or array-processed is computed (i.e., in the scalar processing). In this example, the addresses of the respective A(1, 1) B(1, 1) and C(1, 1) are determined as the start addresses of the array data A, B and C.

Set Up 3:

The address increment INCV between adjoining elements relating to the control variables J of the respective DO loops of the array data A, B and C, e.g., between A(I, j) and A(I, j+1) is computed (i.e., in the scalar processing). Even for any of the array data A, B and C of this example, the address increment INCV relating to the control variable J takes a value of 800 partly because the array data A is a 100×100 array and partly because one word is composed of 8 bytes. Moreover, the address increment INCA between the adjoining elements, e.g., the A(i, J) and A(i+1, J) relating to the control variable I of the internal DO loop of the array data is computed as a function of the control variable J. This increment INCA(J) is determined by the scalar and vector processings because it is generally the vector data. In this example, the address increment INCA(J) between the adjoining elements relating to the control variable I for the array data A, B and C takes a value of 8 irrespective of the value of the control variable J because each element is composed of 8 bytes. In case the program to be executed is the single DO loop requiring the vector computation, on the other hand, the address increment beween the adjoining data by the control variable of the DO loop is computed and is indicated at INCV (i.e., in the scalar processing).

Set Up 4:

From the start address VADR and the address increment INCV of the respective array data A, B and C, the address AADR(J) of the start element of the vector data A(I, J), B(I, J) and C(I, J) (I=1 to J+1) using the control variable I of the interal DO loop of the double DO loop as their variable is calculated (i.e., in the vector processing). In this example, the address ASDR(J) (J=1 to M) of the array data A becomes the addresses of A(1, 1), A(1, 2), - - -, and A(l, k M). Likewise, the addresses AADRB(J), AADRC(J) of the array data V, C are given. Incidentally, in case the program is made of a single DO loop, the address of the start element of the data to be processed by that DO loop is determined as the start address AADR.

Set Up 5:

The start instruction address of the vector and array instruction series existing on the main storage unit C51 is computed (i.e., in the scalar processing).

FIG. 11B enumerates the instruction series for executing the program shown in FIG. 11A. When the vector and array instruction series V1 to V11 are to be started by the central vector processing unit VPC and by the vector processing units PE$_1$ to PE$_M$, the scalar processing unit SP conducts the scalar instruction series S1 and S2.

(Scalar Instruction Series S1)

This instruction series S1 executes that one of the aforementioned set up processings, which is indicated at the scalar processing. The scalar processing unit SP used is that which is simplified from the scalar processing unit disclosed in the U.S. patent application Ser. No. 361,478, now U.S. Pat. No. 4,541,046. More specifically, the scalar processing unit of the above-identified application is so constructed that it can execute the following six instructions in addition to the general scalar instructions:

(1) Start Vector Processor (SVP) instruction;
(2) Set Vector Address Register (SVAR) instruction;
(3) Set Vector Address Increment Register (SVAIR) instruction;
(4) Set Scalar Register (SSR) instruction;
(5) Read Scalar Register (RSR) instruction; and
(6) Test Vector Processor (TVP) instruction.

The scalar processing unit SP of the vector processor system of the present invention is so constructed that it can execute the SVP, SSR and TVP instructions of the above-specified six instructions. More specifically, that scalar processing unit SP is made to have a construction, in which the flip-flop is to be set with the decoded results of the SVAR, SVAIR and RSR instructions, the output lines for that flip-flop and the data lines for executing the RSR instruction are omitted from the scalar processing unit of the above-identified application.

The instruction series S1 computes the aforementioned scalar data, which is necessary for executing the vector and array instructions as the set up processings, and sets those of the scalar data other than the vector length VL and the start instruction address in the scalar registers SC of the central vector processing unit VPC. For these processings, the necessary data is computed by the usual scalar instruction and stored in the general register GR (as shown in FIG. 3), and the scalar data of the general register GR are set in the scalar registers SC by the SSR instruction.

When the SSr instruction is decoded by the scalar processing unit SP, the central vector processing unit VPC (as shown in FIG. 8) receives both the data in the general register GR selected from the line 37 and the register number of the scalar register SC designated by that instruction from a line 35. Selectors L24 and L25 respectively select the register number and the scalar data on the lines 35 and 37 in response to the "0" signal on the output line 36 of a flip-flop (which will be shortly referred to as "FF") F5 which is in its reset state at that time. The scalar register SC is fed through a line 70 with the write signal, which is prepared by decoding the SSR instruction, from the scalar processing unit SP. A multiplexer L26 sends out the scalar data from the selector L25 to one scalar register SC$_i$ which corresponds to the register number fed out of the selector L24. Thus, the scalar data are written in the scalar register SC$_i$ which is designated by the SSR instruction. Incidentally, the F and F5 is set with "0", when the scalar processing unit SP is in operation, and with "1" when the vector processing unit PE$_i$ is in operation.

By the processing thus far described, the following scalar data can be set in the scalar registers SC. The scalar register SC1 stores the start address VADR(a) of the array data A. Likewise, the scalar register SC2 stores the start address VADR(B) of the array data B; the scalar register SC3 stores start address VADR(C) of the array data C; scalar register SC4 stores the address increment INCV relating to the control variable J of the array data A (which increment has a value equal to the address increments INCV of the array data B and C in this program); the scalar register SC5 stores the address increment INCA relating to the control variable I of the array data A (which increment has a value equal to the INCA of the array data V and C in this case); and the scalar register SC6 stores the scalar data "2" which is necessary for computing the vector length AL.

(Instruction S2)

When the set up by the SSR instruction series is completed, the SVP instruction for instructing the start of the execution of the vector and array instructions is executed for the central vector processing unit VPC. When this SVP instruction is executed, both the vector length VL and the start instruction address of the vector and array instruction series are read out from the general register GR designated by that instruction and are sent out to the central vector processing unit VPC through lines 60 and 37, respectively. Moreover, the SVP instruction decoding signal is fed from the scalar processing unit SP to a line 57. In response to this signal, the vector length VL on the line 60 is stored in a VLR register M4. In response to the SVP instruction decoding signal on the line 57, moreover, a selector L35 selects the start instruction address of the vector and array instruction series on the line 37 and stores it in an instruction address register (IAR) M5. Moreover, the signal on the line 57 is fed to set the FF F5, the set outputs of which are received through the line 36 by a vector instruction control circuit (1) C1 to instruct the start of execution of the vector and array processings. Thus, the scalar processing unit SP conducts an instruction S3 (as shown in FIG. 11) after the central vector processing unit VPC has been started.

(Instruction S3)

This is the TVP instruction which partly tests the operating states of the central vector processing unit VPC and the vector processing unit $PE_i$ on the basis of the output signals of the FF F5 and partly sets the condition code. This condition code is set at 1, when the central vector processing unit VPC or the vector processing unit $PE_i$ is in operation, but at 0 when not in operation. The condition code is used in the BRANCH-ON-CONDITION instruction which has been described in the Manual "System/370 Principles of Operation (GC-22-7000)" published by IBM Inc. For the condition code at 1, the TVP instruction and the BRANCH-ON-CONDITION instruction are repeated until the subsequent scalar instruction is executed when the condition code takes a value of 0. Next, the central vector processing unit VPC and the vector processing unit $PE_i$ (as shown in FIGS. 8 and 9) will be described in the following. When the vector instruction control circuit (1) C1 of the central vector processing unit VPC is started, the instruction address set in the instruction address register M5 is sent through the line 71 to the main storage control unit C52 so that the start instruction of the vector and array instruction series in the main storage unit C51 is read out on the basis of that address and set in the instruction register M1 through the main storage control unit C52 and through the line 63. In the example of FIG. 11A, the first vector and array instruction V1 is set in the register M1.

When the instruction is set in the register M1, the instruction code OP, the A1 and V1 bits, the A2 and V2 bits, and the A3 and V3 bits, respectively, existing in the fields M71 to M73, M75, M76, M78 and M79 of that register M1 are fed through a line 1 to the vector instruction control circuit (1) C1. This circuit C1 controls the vector ALU C3 or other circuits on the basis of the instrcution code OP and instructs the scalar register SC and the vector register VC to read and write on the basis of the A1, V1, A2, V2, A3 and V3 bits. Incidentally, the scalar register number $SC_i$ or the vector register number $VC_i$ to write is given from the selector L24 or an AND gate L14, as will be described hereinafter.

Moreover, the A1, V1, A2 and A3 bits of that instruction are fed through lines 2, 3, 4 and 6, respectively, to the circuit which is composed of an OR gate L4, and AND gates L8, L9, L10 and L11, so that the vector and array instructions are classified into four types to set one of the corresponding flip-flops F1 to F4. The FF F1 is set by an array instruction used to write the computation result in the array register AR, i.e., the instruction for A1=1. The FF F2 is set by an array instruction used to write the computation result in the vector registers VR, i.e., the instruction for A1=0 and A2 or A3=1. The FF F3 is set by a vector instruction used to write the computation result in the vector registers VR, i.e., the instruction for A1=A2=A3=0 and V1=1. The FF f4 is set by a vector instruction used to write the computation result in the scalar registes SR, i.e., the instruction for A1=A2=A3=0 and for V1=0.

In order that the register number designated by the instruction may be sent out to the vector register corresponding to the central vector processing unit VPC, moreover, the V1(M73), V2(M76) and V3(M79) fields of the instruction and the register numbers R1(M74), R2(M77) and R3(M80) are fed respectively through lines 3, 5, 7, 14, 15 and 16 to AND gates L13, L14, L15, L16, L17 and L18. The AND gates L13, L15 and L17, respectively, generate the register numbers R1, R2 and R3 on lines 22, 24 and 26 when the numbers R1, R2 and R3 are those of the scalar register SC, namely, for V1, V2 and V3=0. Moreover, the AND gates L14, L16 and L18, respectively, generate the register numbers R1, R2 and R3 on lines 23, 25 and 27 when the numbers R1, R2 and R3 are those of the vector register VC, i.e., for V1, V2 and V3=1.

The vector and array instructions V1 to V11 (as shown in FIG. 11) will be described in the following. The instruction V1 effects the computation of the vector length AL(J); the instructions V2 to V5 effect the computations of the respective addresses AADR(J) of the array data A, B and C; and the instruction V6 effects the computation of the address increment INCA(J) shared among the array data A, B and C. The description thus far made is directed to the set up by the vector processings. The array data B and C are read out from the main storage unit C51 in response to the instructions V7 and V8. The addition of the array data B and C is conducted in response to the instruction V9. The computation result is written in the main storage unit C51 in response to the instruction V10. In response to the instruction V11, it is informed that the vector and array instruction series have been ended. Incidentally, the scalar registers SC1 to SC6, which have been designated by the instructions V1 to V6 for realizing the conceptual scalar registers SR1 to SR6, are set with the necessary scalar data, as has been described hereinbefore. On the other hand, both the 1st to Mth element of the vector register VC2 and the scalar registers $S_12$ to $S_M2$ of the vector processing units $PE_1$ to $PE_M$ for embodying the conceptual register $VR_2$ are assumed to be stored in advance with the constart vector of 0, 1, - - -, and M−1.

(Instruction V1)

Since this instruction V1 is a vector one to be written in the conceptual vector registers VR1, the FF F3 is set and the register numbers "1", "2" and "6" are set on the lines 23, 25 and 26, respectively.

A selector L27 is made operative to send the contents of the scalar registers, which are respectively designated by the register numbers fed from the lines 22, 24 and 26, to selectors L3, L32 and L31, respectively. In this case, the content "2" of the scalar register SC6 is fed to the selector L31. A selector L28 is made operative to select the vector registers, which are respectively designated by the register numbers fed from the lines 23, 25 and 27, and to connect them with the selectors L3, L32 and L31. In this case, the vector register VC2 is selected and connected with the selector L32. The selector L31 selects the output of the selector L27 or L28 in dependence upon whether the bit V2 of the instruction fed through the lines 5 is 0 or 1. The selector L32 selects the output of the selector L27 or L28 in dependence upon whether the bit V3 of the instruction fed through the line 7 is 0 or 1. In this case, for V2=1 and V3=0, the selectors L27 and L28 are respectively selected by the selectors L32 and L31. As a result, the outputs of the scalar register SC6 and the vector register VC2 are fed to the vector ALU C3.

The instruction V1 is one which affects the addition of both a constant 2 in the scalar registers SR65 and constants 0 to M−1 in the vector registers VR2 thereby to effect the storage of the vector of the constants 2 to M+1 in the vector registers VR1. This result vector indicates the vector length AL(J), which is processed by the internal DO loop.

The vector instruction control circuit (1) C1 is made operative to decode the operation code OP and to control the execution of that code. In the case of the ADD instruction, the vector instruction control circuit (1) C1 instructs the scalar and vector registers SC, VC to continuously read out the elements one by one and starts the vector ALU C3. This vector ALU C3 adds the constant 2, which is fed from the scalar register SC2, and the respective elements of constant vector, which is fed from the vector register VC2, in the well-known pipeline mode thereby to provide a vector composed of constants 2 to M+1. The vector instruction control circuit (1) C1 sends out the store instruction to the scalar or vector registers SC, VC, which is designated by the instruction, as soon as possible after the result of the vector computation appears on a line 54. The selectors L24 and L25 respectively select the write scalar register number (on the line 22) designated by the vector instruction and the data (on the line 54) because the output of the FF F5 on the line 36 is "1". Moreover, a selector L40 selects a line 77 in response to the signal (on a line 55), which is generated by the vector instruction control circuit (1) C1 when in a later-described LOAD instruction, but selects the line 54 when in the other operations. As a result, in the case of the ADD instruction, the computation result on the line 54 is selected by the selector L40 and is read out into the line 44. On the other hand, a selector L30 is selected in response to such signals on the aforementioned signal line 55 and on a line 19 to indicate whether the Ff F2 has been set or not. In case this FF F2 has been set, the gate on a line 45 is selected. In the case of the LOAD instruction, the data on the line 43 is selected. In the other cases, the data on the line 44 is selected. In this case, therefore, the computation result vector on the line 44 is selected and fed to the vector register VC1 of the write register number on the line 23 by the action of a multiplexer L29 so that the respective elements of the computation result vector are sequentially stored.

The computation of a certain element i of the vector data and the store of the computation result of a previous element (i−1) are conducted in parallel.

In response to the instruction to effect the setting of the FF F3, on the other hand, identical computation results are written in both the vector register VC2 and the scalar registers $S_12$ to $S_M2$ in the vector processing units $PE_1$ to $PE_M$ for realizing the identical conceptual vector registers VR2. This makes it necessary to consecutively send the computation results on the line 44 to the respective vector processing units $PE_1$ to $PE_M$. When the FF F3 is set, its output is sent out through a line 20 to a computation result send signal circuit C4. This computation result send signal circuit C4 is equipped with a counter (although not shown) and a decoder (although not shown). This counter is reset by the output of the FF F3 to count the computation result end signals for each element, which are fed from the vector ALU C3 to a line 53, and sends out the send signal to that one of signal lines $52_1$ to $52_M$ coupled to the respective vector processing units $PE_1$ to $PE_M$ which corresponds to that counted value. The computation result send signal circuit C4 reads out the vector length VL, which is set in the VLR register M4, through a line 50 and compares it with the counted value thereby to judge the end of the computation. In the case of the computation end, the computation result send signal circuit C4 resets the FF F3 through a line 48. In the meanwhile, the computation result is sent out from the line 44 to the vector processing units $PE_1$ to $PE_M$ through the selector L40. On the other hand, the output of the FF F3 is sent out through the line 20 to the vector processing units $PE_1$ to $PE_M$ thereby to indicate the intake of the data on the line 44. Moreover, the write vector register number is sent out to those units from the line 23.

In each vector processing unit $PE_i$ (as shown in FIG. 9), on the other hand, a selector L108 selects the data on the line 44 in response to output signal "1" of the FF F3 on the line 20, and a selector L107 selects the register number (i.e., the numeral 1 in this case) on the line 23 from the central vector processing unit VPC. By the action of a multiplexer L 109, the data on the line 44 is fed to the scaler register $s_i1$ and is stored when the computation result send signal is fed from the line $52_i$. Thus, the processings of the instruction V1 are ended.

When the FF F3 is reset by the computation result send signal circuit C4, on the other hand, the output of a NOR gate L21 having received the output signals of FFs F1 to F4 takes a value 1 and is fed through a line 32 to the vector instruction control circuit (1) C1. One of the FFs F1 to F4 is set with the vector and array instructions are executed, and the FF thus set is reset when the computation ends. As a result, the signal on the line 32 becomes "1" at the end of the computation. In synchronism with this signal, the vector instruction control circuit (1) C1 sets the instruction address register M5 with the subsequent instruction address which is given from a +1 adder C6 throught selector L35. This subsequent instruction address thus set is sent through the line 71 to the main storage control unit C52 so that the subsequent vector or array instruction is set from the main storage unit C51 in the vector and array instruction register M1.

(Instructions V2 to V6)

These instructions V2 to V6 use the same kind of registers as that of the instruction V1, and the FF F3 is set and processed likewise when the instruction V1 is fed. Here, the instruction code MULT of the instruction V2 implies the multiplication, and the instruction code MOVE of the instruction V6 implies the transfer. Incidentally, the MOVE instruction does not have the R3 field M80. The instruction V2 is one, which instructs the product of the address increment INCV for the external loop processing stored in a scalar register SR4 (i.e., a scalar register SC4) and the content vector 0 to $M-1$ stored in the vector register VR2 (i.e., the vector register VC2 and the scalar register groups $S_12$ to $S_M2$) and effects the storage of that product in the vector registers VR3 (i.e., the vector register VC3 and the scaler registers $S_13$ to $S_M3$). On the other hand, the instruction V3 is one which instructs the storage in the vector register VR4 of the sum of the start address VADR of the array data A stored in the scaler registers SR1 and the vector data 0 to $(M-1)\times INCV$ stored in the vector register VR3 in response to the instruction V2. As a result, the vector register VR4 stores the address $AADR_A(J)$ of the start element A(1, J) of the column vector A(I, J) (I=1 to J+1) for a different J, which is to be processed in the internal loop in response to the instruction V3.

The instruction V4 effects the storage in the vector register VR5 of the vector, which is composed of the address $AADR_B(J)$ of the start element V(1, J) of the column vector B(I, J) (I=1 to J+1) of the array data B, which is to be processed by the internal loop, likewise the instruction V3 by using the start address $VADR_B$ of the array data B existing in a scalar register SR2.

Likewise, the instruction V5 effects the vector register VR6 with the vector which is composed of the start address $AADR_C(J)$ of the array data C for a different J.

The instruction V6 is one, in response to which the address increment INCV shared among the array data A, B and C existing in scalar register SR5 is written as it is in each element of the vector registers VR7. This instruction is executed by writing the address increment INCV existing in scalar register SC5 through the vector ALU C3 in a vector register VC7 and in the scalar registers $S_17$ to $S_M7$. Thus, the vector having each element equal to the address increment INCV is stored in the vector register VR7.

(Instruction V7)

This instruction designates the main storage unit C51 to fetch the plural vector data, in which the start address is each element of the vector of the start address $AADR_B(J)$ in the vector register VR5 and in which the increment is each element of the vector of the address increment INCV in the vector registers VR7, and to store them in the array register AR1.

When this instruction V7 is set in the instruction registers M1, the FF F1 is set. The output signal of the FF F1 on a line 18 is fed to an OR gate L22, the output of which is fed through a line 30 to vector instruction control circuit (1) C1 and to the vector instruction control circuit (2) C101 (as shown in FIG. 9) of each vector processing unit PE$_i$. The OR gate L22 is fed with the outputs of the FFs F1 and F2 so that its output becomes "1" in response to the array instruction. The vector instruction control circuit (1) C1 interrupts its decoding when it is fed with the signal "1". On the other hand, the vector instruction control circuit (2) C101 sets an array instruction register M101 with the array instruction existing on the line 63 when it is fed with the signal "1" through the line 30.

The instruction codes OP, A1, V1, A2, V2, A3 and V3 existing in instruction fields M171 to M173, M175, M176, M178, and M179 set in the register M101 are fed through a line 102 to the vector instruction control circuit (2) C101. This circuit C101 controls a vector ALU C103 and other circuits on the basis of the instrcution code OP thereby to execute the instructions and further controls the wirte and read of the scaler registers S$_i$ and the vector register V$_i$. Incidentally, the number j of the scalar register S$_i$j or the vector register V$_i$j to conduct the writing operation is given from the selector L107 or an AND gate L102.

In order to send out the register numbers R1 to R3 designated by the instructions to the corresponding registers, the A$_1$, A$_2$ and A$_3$ fields and the register numbers R (M174), R2(M177) and R3 (180) are fed through lines 103, 105 and 107 and through lines 104, 106 and 108, respecitvley, to AND gates L101, L102, L103, L104, L105 and L106. The AND gates L101, L103 and L105 respectively send out the register numbers R1, R2 and R3, when these numbers R1, R2 and R3 correspond to the vector register VR, i.e., for A1=0, A2=0 and A3=0, to lines 109, 111 and 113. On the other hand, the AND gates L102, L104 and L106 respectively send out the register numbers R1, R2 and R3 to lines 110, 112 and 114 when the numbers R1, R2 and R3 correspond to the array register, i.e., for A1=1, A2=1, and A3=1. In the case of the instruction V7, the lines 110, 111 and 113 are set with the register numbers "1", "5" and "7", respectively.

When the instruction V7 is decoded, the vector instruction control circuit (2) C101 feeds the vector length in the first scalar register S$_i$1, which is to be fed from a line 163, i.e., the ith element AL(i) to a vector reference control circuit C102 thereby to start it. The scaler registers S$_i$5 and S$_i$7, which respectively store the ith element of the start address $AADR_B(i)$ and the increment INCA of the array B designated by that instruction, have their numbers 5 and 7 fed to a selector L110 through lines 111 and 113, respectively, so that the selector L110 reads out the $AADR_B(i)$ and the INCA on lines 115 and 116, respectively, and sends them to the vector reference control circuit C102. The start address $AADR_B(i)$ and the increment INCA(i) of array B are equal to the address of B(1, i) and 8 in this case, respectively. The circuit C102 generates the address, which is prepared by sequentially renewing the ith element of the start address $AADR_B(i)$ by the increment INCA, and sequentially feeds it to the SCU C52 through the line 130$_i$ on the basis of those data read out so that the ith column vector elements B(1, i) to B(i+1, i) of the array data B may be read out. On the other hand, the read data on the line 119$_i$ are selected by a selector L113 in response to the LOAD instruction decode signal coming from the vector instruction control circuit (2) C101 and existing on a line 120 and are stored in the first vector register V$_i$1 by the action of a selector L112 which is controlled by the write register number existing on the line 110. When the data of the necessary vector length AL(i) is read out to end the computation, the vector instruction control circuit (2) C101 informs the central vector processing unit VPC of the computation end through a line 61$_i$. The processing thus far described are conducted in parallel by each vector processing unit PE$_i$ so that all the necessary column vectors of the array data B are stored in the array registers AR1.

On the other hand, the central vector processing unit VPC receives the end information at FFs F6$_1$ to F6$_M$ (as shown in FIG. 8) through lines 61$_1$ to 61$_M$. Moreover, the outputs of those FFs are received by an AND gate L88 so that the signal "1" is generated on a line 56 when all the vector processing units PE$_i$ end their computations. When the FF F1 is set as in the case of the instruction being considered, it is reset through an AND gate L23 and a line 34.

On the other hand, the resets of the FFs $F6_1$ to $F6_M$ are conducted through a line 62 by the vector instruction control circuit (1) C1 in response to the subsequent instruction decode.

(Instructions V8 to V10)

These instructions V8 to V10 are also ones, in response to which the FF F1 is set similar to the instruction V7, and are executed by the vector processing unit $PE_i$.

In response to the instruction V8, the array registers AR2 store the array data C in the main storage unit C51. The processing of the ADD instruction is conducted in the following manner.

In the vector processing unit $PE_i$, the register numbers 1 and 2 are fed out from the AND gates L104 and L106 to the lines 112 and 114, and the vector registers $V_i1$ and $V_i2$ are connected to selectors L115 and L114, respectively, by the action of a selector L111. These selectors L115 and L114 select the selector L111 when the A3 and A2 bits generated from the instruction register M101 to the lines 107 and 105 take a value of 1. Thus, the vector registers $V_i1$ and $V_i2$ are connected with the vector ALU C103.

In response to the instruction code of the instruction V9, the vector instruction control circuit (2) C101 sequentially reads out the ith column vectors B(1, i) to B(i+1, i) and C(1, i) to C(i+1, i) of the array data B and C one element by one element from the vector registers $V_i1$ and $V_i2$.

For the respective elements of the data thus fed, the vector ALU C103 conducts the computation, which are designated by the instructions, in the well-known pipeline manner under the control of the vector instruction control circuit (2) C101. In the case of the instruction V9, the vector ALU C103 performs the addition to sequentially feed out the ith column vectors A(1, i) to A(i+1, i) of the array data A. The computation result is fed through a line 117 to the selectors L113 and L108. These selectors L113 and L108 select together the line 117 because the signals on the respective lines 20 and 120 take a vaue of 0. However, the multiplexer L109 receiving the output of the selector L108 does not receive the register number from the selector L107. This is because the selector L107 selects the AND gate L101 from which no register number is fed out since the A1 bit of the instruction V9 takes a value of 1.

On the other hand, the multiplexer L112 receiving the output of the selector L113 is fed with the register number 3 from the AND gate L102. Thus, the computation result is transferred to the vector register $V_i3$ under the control of the vector instruction control circuit (2) C101. As a result, the vector register $V_i3$ stores the ith column vector A(1, i) to A(i+1, i) of the array data A. Since the vector processing units $PE_1$ to $PE_M$ execute those processings in parallel, the array data A is stored in the array register AR3.

In each vector processing unit $PE_i$, upon the execution of the STORE instruction V10, the contents of the scalar registers $S_i4$ and $S_i7$, which have both the address AADR and the increment INCA of the ith column vector of the array data A designated by the R2 and R3 fields of the instruction V10 like the LOAD instruction V7 or V8, are selected by the selector L110 and are fed to the vector reference control circuit C102.

The vector instruction control circuit (2) C101 receives the ith element AL(i) of the vector length vector existing in the scalar register $S_i1$ and sends it out to start the vector reference control circuit C102. This circuit C102 sequentially generates the addresses, which are to be stored with the respective elements of the ith column vector A(1, i) to A(i+1, i) of the array data A, on the main storage unit C51 from those data and sends them to the main storage unit C51 through line $130_i$ and the SCU C52. Moreover, the vector register $V_i3$, which stores the ith column vectors A(1, i) to A(i+1, i) of the array data A to be stored, is selected by the selector L111 responding to that instruction R1 field and by a selector L130 responding to that instruction Ai field so that this data is read out one element by one element onto the line $118_i$ and is stored in the main storage unit C51 on the basis of the address which is fed out from the vector reference control circuit C102.

(Instruction V11)

This EAP instruction V11 is one which is controlled not by the R1, R2 ahd R3 fields but only by the instruction code OP M71. When this instruction is set in the vector and array instruction register M1, the vector instruction control circuit (1) C1 resets the FF F5 through a line 58, to inform the scalar processing unit SP of the fact that the vector and array processings have ended.

The description of the operatiosn by the program of FIG. 11 is finished, but the instructions for setting the FF F2 or F4, although they have not appeared in that program, will be described hereinafter.

FIG. 12A shows the program example and a portion of the rear half of its vector and array instruction series.

(Instruction V101)

This instruction V101 is one which instructs the storage of the computation result in the vector registers VR. Like the case in which the FF F1 is set, the FF F2 is set and the instruction register M101 of the vector processing unit $PE_i$ is set with the array instruction on the line 63 in response to the signal coming from the OR gate L22 and appearing on the line 30. The vector instruction control circuit (2) C101 decodes the instruction code OP M171. A PROD instruction implies the inner product. In each vector processing unit $PE_i$, the inner product between the ith column vectors A(1, i) to A(N, i) and B(1, i) to B(N, i) of the array data A and B, which respectively exist in the vector registers $V_i1$ and $V_i2$, is taken and this result S(i) is stored in the scaler register $S_i3$. Moreover, the end of the computation is reported through the line $61_i$ by the vector instruction control circuit (2) C101 for the central vector processing unit VPC. Still moreover, the computation result S(i) is also stored in the following manner in the vector register VC3 which belongs to the central vector processing unit VPC.

When the FF F2 is set, its output is sent out through the line 19 to a computation result send requiring circuit C5. The detail of this circuit C5 is shown in FIG. 10. With reference to FIG. 10, the Ffs $F201_1$ to $F201_M$ and the FFs $F202_1$ to $F202_M$ are first reset by the output line 19 when the FF F2 is set. The FF $F201_i$ is set in response to the computation end signal coming from each vector processing unit $PE_i$ and existng on the line $61_i$. The FF $F202_i$ is set in response to the signal, which is fed out from an encoder C201 through a line $202_i$, when the encoder C201 generates the computation result send requiring signal for the vector processing unit $PE_i$ on a line $51_i$, as will be described hereinafter. The output of the FF $F201_i$, the inverted signal of the output of the FF $F202_i$ and the output of the FF $F202_{i-1}$ are respectively connected to an AND gate L300$_i$ through lines 204$_i$, 203$_i$ and 203$_{i-1}$, and the output of the AND gate L300$_i$ is fed through a line 201$_i$ to the encoder C201. This encoder C201 sends out the computation result send requirement signal to the line 51$_i$ when it receives the signal 1. As a result, the encoder C201 can send out the computation result send requirement signal in a sequential manner to the vector processing units PE$_i$ to PE$_M$ through lines 51$_1$ to 51$_M$, respectively. At this time, this requirement for the vector processing unit PE$_i$ is not sent out before the computations at the vector processing units PE$_i$ have ended. Moreover, the encoder C201 compares the vector length VL of the VLR register M4, which is fed through the line 50, with the number of times at which the send requirement is made, and resets the FF F2 through a line 49 when all the send requirements have ended.

On the other hand, the vector processing unit PE$_i$ sets the computation results S(i) in the FF F101 by the control of the vector instruction control circuit (2) C101 and sends out the computation result on the line 47$_i$ by an AND gate L116 when the send requiring signal is sent through the line 51$_i$.

Moreover, the central vector processing unit VPC sends out the data, which is sent from each vector processing unit PE$_i$ through lines 47$_i$ to 47$_M$, to the selector L30 through the line 45 by the action of an OR gate L33. The selector L30 selects the line 45 in response to the output of the FF F2, and the multiplexer L29 effects the writing operation in the ith element of the vector register VC3 in response to the vector register number 3 which is fed from the AND gate L14 through the line 23.

(Instructions V102 and V103)

These instructions V102 and V103 are the aforementioned LOAD and ADD instructions for setting the FF F3. In the central vector processing unit VPC, the start address VADR of a vector D and the address increment INCV of the address are read out onto lines 39 and 38, respectively, from the scalar registers SC1 and SC2, which are designated by the R2 and R3 fields, in response to the LOAD instruction V102 and are fed to a vector reference control circuit C2. This circuit C2 sequentially feeds those storage addresses to the SCU C52 through the line 64 on the basis of the data so that those elements D(1) to D(M) of the vector data D whose number is designated by the vector length register M4, may be read out. As a result, the vector elements D(1) to D(M) are sequentially read out onto the line 43, and the selectors L29 and L30 are controlled to effect the storage in the vector register VC4 on the basis of the "1" signal, which is fed out from the vector instruction control circuit (1) onto the line 55, the "0" output of the FF F2 and the register number "4" from the AND gate L14. In response to the instruction V103, the addition of the data S(1) to S(M) in the vector register VC3 and the data D(1) to D(M) in the vector register VC4 is conducted, and the results C(1) to C(M) are written in the vector register VC5.

FIG. 12B shows an example of the program, which contains the instruction for setting the FF F4, and an instruction for executing it.

(Instruction V104)

This instruction V104 is an example of the instruction fior setting FF F4.

For simplicity of discussion, it is assumed here that the vector registers VR7 and VR8 have already stored the vector data X and Y, respectively. The instruction V104 is one which instructs determination of the inner product S of that vector data and writes it in the scaler register SR7. When this instruction V104 is set in the instruction register M1, the inner product of the data X(1) to X(M) and Y91) to Y(M) of the vector registers VC7 and VC8 is determied by the vector ALU C3 under the control of the vector instruction control circuit (1) C1, and the result S is written in the scalar register SC7 through the selector L25 and the multiplexer L26.

In the embodiment thus far described, indicentally, the description has been directed to the external DO loop by which computations of the same number of elements as that M of the vector processing units PE$_1$ to PE$_M$ are conducted. However, the number of the elements to be computed in external DO loop is larger than M, it is sufficient that the vector processing units PE$_1$ to PE$_M$ may be repeatedly used. If the number of the computation elements of the external DO ldop takes a value M' smaller than M, all the vector processing units PE$_1$ to PE$_M$ may be so apparently controlled that their computation results may not be used.

The array processor thus far described in connection with the foregoing embodiment is enabled to enjoy the following effects.

(1) The vector and array computations are separately executed by the central vector processing unit for conducting the vector computations and by the plural vector processing units for conducting the array computations. Thanks to the construction in which the vector register in the central vector processing unit and the scalar registers in the plural vector processing unit are used as interfaces, not only the computations between the array data and the array data and between the vector data and the vector data but also the computations between the array data and the vector data, between the vector data and the scalar data and so on can be processed at a high speed.

(2) Since the vector processor having the vector registers is used for the array processings, an intermediate value of the computations can be held in the vector registers so that the load upon the main storage, which has provided a bottleneck against the parallel computer of the prior art, can be reduced.

(3) Since each of the plural vector processing units for the array computations is equipped with the scalar registers for designating the vector length AL, the array computations of not only a rectangular region but also an arbitrary region can be conducted.

(4) Since the instruction format for specifying the operations of the array processor of the present invention are divided into the instruction code portion for instructing the computations and the portion for indicating the data type of an operand, the combination of the computation data types between the array data and the array data, between the array data and the vectory data and so on can be easily determined by the simple decoding circuit for the portion indicating the data type. Moreover, an identical instruction code can also be used for a different combination of the computing data type.

(5) Since the processor of the vector and array computing portion is formed into a hierarchy structure of the central vector processing unit and the plural vector processing units, the set up processing to the plural vector processing units for the array computations can be conducted by the vector processings at a high speed. In the construction having no central vector processing unit, the set up processings are conducted by the sequential processing resorting to the scalar processing unit so that it raises a high obstruction to the performance.

In the foregoing embodiment, moreover, the identify of the contents of the vector registers $VC_i$ of the central processing unit VPC and the scalar registers $S_1i$ to $S_Mi$ of the vector processing units $PE_1$ to $PE_M$ is warranted for simplicity of discussion. For the register writing operation which is not required of the transfer to the other units, however, the control without the transfer (e.g., the calculation of the intermediate value) can be easily realized by determining the register number without the transfer.

As has been described hereinbefore, according to the present invention, the array computations can be conducted at a high speed as a result of the speed-up effect of the vector processings by the vector processors using the vector registers and by their parallel processings.

What is claimed is:

1. A vector processor system comprising:
   (a) a main storage;
   (b) a plurality of processor means connected to said main storage each of which includes:
   (b1) a plurality of vector registers each for holding a set of vector elements;
   (b2) vector operation means connected to said vector registers for performing an operation on inputs sequentially provided thereto to provide sequential outputs as a result of the operation on the inputs;
   (b3) vector refer control means connected to said main storage and said vector registers for accessing said main storage to transfer vector elements between said main storage and said vector registers;
   (b4) an instruction register connected to said main storage to hold an instruction fetched therefrom; and
   (b5) vector instruction control means connected to said main storage and responsive to an instruction fetched therefrom for efffecting sequential reading of vector elements from one of said vector registers designated by an instruction held by said instruction register to said vector operation means or to said main storage, and for effecting sequential writing of vector elements provided by said vector operation means or fetched from said main storage by said vector refer control means into one of said vector registers designated by the said instruction;
   (c) wherein said vector instruction control means in one of said plurality of processor means is connected to said main storage to respond to a first kind of instruction fetched from said main storage; and said vector instruction control means in other one of said plurality of processing means are connected to said main storage to receive in parallel and respond to the same instruction of a second kind of instruction fetched from said main storage.

2. A vector processor system according to claim 1, wherein each of said other processor means further includes a plurality of scalar registers connected to said vector operation means in each other processor means each for providing a scalar data element repeatedly stored in each scalar register as an operand to said vector operation means in each other processor means and for storing a result scalar data element when said vector operation means provides the result scalar data element as the result of the operation on the operand vector elements provided thereto or on the operand vector elements and the operand scalar data element; and wherein said one processor means further includes:
   send means connected to both said vector operation means and said vector refer control means in said one processor means for sending out vector elements provided by said vector operation means or fetched by said vector refer control means each to one of said scalar registers of a corresponding one of said other processor means; and
   receive means connected to said vector registers of said one processor means for receiving a set of result scalar data elements each from one of said scalar registers of a corresponding one of said other processor means, and for writing the set of result scalar data elements into one of the vector registers of said one processor means as a set of vector elements, wherein each result scalar data element is provided by a corresponding one of said other processor means as a result of the operation by said vector operation means in said corresponding other processor means.

3. A vector processor system according to claim 1, wherein said one processor means includes instruction fetch means connected to said main storage for fetching instructions to be executed either by said one processor means or by other ones of said processor means; and wherein one of each other ones of said processor means are connected to said instruction fetch means so as to receive the same instruction fetched by said instruction fetch means when the fetched instruction is said second kind of instruction.

4. A vector processor system according to claim 3, wherein said one processor means includes send means connected to said vector operation means in said one processor means for sending out a set of vector elements provided by said operation means each to a corresponding one of said other processor means, wherein each vector element represents a data signal required by the corresponding other processor means for control of the execution of the second kind of instruction thereby.

5. A vector processor system according to claim 4, wherein each vector element sent by said send means represents the vector length of vector elements to be fetched by said vector refer control means or to be operated by said vector operation means of said corresponding other processor means.

6. A vector processor system according to claim 4, wherein each vector element sent by said send means represents an address of the first vector element of a set of vector elements to be fetched from said main storage by said vector refer control means of said corresponding other processor means.

7. A vector processor system according to claim 4, wherein each vector element sent by said send means represents an increment value representing an address difference between two adjacent vector elements of a set of vector elements to be fetched by said vector refer control means of said corresponding other processor means.

8. A vector processor system comprising:
   a main storage;
   a plurality of groups of vector registers connected to said main storage;
   a plurality of vector operation means each connected to a corresponding group of vector registers;
   instruction fetch means connected to said main storage for fetching instructions, wherein each instruction includes at least one register number field; and a discrimination field associated with the register number field for indicating whether or not a register number in the register number field represents a single vector register or a group of vector registers;

control means connected to said instruction fetch means and responsive to a fetched instruction for effecting an operation by one of said vector operation means on vector elements stored in one of said vector registers identified by the register number designated by the fetched instruction within one of said plurality of groups, when the fetched instruction does not have a discrimination field which indicates a group of vector registers, and for simultaneously effecting an operation by plural ones of said plurality of vector operation means each on vector elements stored in one of vector registers identified by the register number designated by the fetched instruction within each of said groups of vector registers each corresponding to said plural ones of said plurality of vector operation means, when the fetched instruction has a discrimination field which indicates a group of vector registers.

9. A vector processor system including a main storage and a plurality of vector processors operable in parallel and connected to said main storage, each vector processor comprising:

(a) a plurality of vector registers each for holding a set of vector elements;

(b) vector operation means connected to said vector registers for performing an operation on inputs sequentially provided thereto to provide sequential outputs or an output corresponding to the results of the operation on the inputs;

(c) vector refer control means connected to said main storage and said vector registers for accessing said main storage to fetch vector elements therefrom to be written into said vector registers or to store vector elements read out of said vector registers into said main storage;

(d) an instruction register connected to said main storage to hold an instruction fetched therefrom; and (e) vector instruction control means connected to said instruction register for effecting sequential reading of vector elements from one of said vector registers designated by an instruction held by the instruction register to said vector operation means or to said main storage and for effecting sequential writing of vector elements provided by said vector operation means or fetched by said vector refer control means into one of said vector registers designated by an instruction held by said instruction register.

10. A vector processor system according to claim 9, wherein said plurality of processor means are connected to said main storage so as to simultaneously respond to the same instruction fetched from said main storage.

11. A vector processor system comprising:

(a) a main storage;

(b) a plurality of vector processors connected to said main storage, each vector processor comprising:

(b1) a plurality of vector registers each for holding a set of vector elements;

(b2) vector operation means connected to said vector registers for performing an operation on inputs sequentially provided thereto to provide sequential outputs or an output corresponding to the results of the operation on the inputs;

(b3) vector refer control means connected to said main storage and said vector registers for accessing said main storage to fetch vector elements therefrom to be written into said vector registers or to store vector elements read out of said vector registers into said main storage;

(b4) an instruction register connected to said main storage to hold an instruction fetched therefrom; and (b5) vector instruction control means connected to said instruction register for effecting sequential reading of vector elements from one of said vector registers designated by an instruction held by the instruction register to said vector operation means or to said main storage and for effecting sequential writing of vector elements provided by said vector operation means or fetched by said vector refer control means into one of said vector registers designated by an instruction held by said instruction register;

(c) wherein said vector processor system further includes transfer means connected to said plurality of vector processors for enabling data transfer between the processors of said plurality of vector processors.

12. A vector processor system, according to claim 11, wherein said transfer means comprises:

send means provided in each vector processor for sending out a data signal provided by each vector processor to at least one other vector processor of said plurality of vector processors; and receive means provided in each vector processor for receiving a data signal sent out by said send means within at least one other vector processor of said plurality of vector processors.

13. A vector processor system according to claim 12, wherein said send means in one of said plurality of vector processors includes means for sending respective vector elements to different ones of the other vector processors, which vector elements are generated by said vector operation means within said one vector processor or are fetched by said vector refer control within said one vector processor;

wherein said send means in each of said other vector processors include means for sending a scalar data signal to said one vector processor, which scalar data signal is generated as a result of the operation on vector elements by said vector operation within each of the other vector processor means.

14. A vector processor system according to claim 13, wherein each of said other vector processors further includes a plurality of scalar registers connected to said vector operation means within each of the other vector processors for receiving the scalar data signal provided by said vector operation means or a vector element received by said receive means within each of the other vector processors, and for providing one of the data signals held by said scalar registers as an operand to said vector operation means; and wherein said receive means within said one vector processor includes means for storing scalar data signals each provided by said send means within one of the other vector processors into one of the vector registers within said one vector processor as a set of vector elements.

* * * * *